US007886854B2

(12) United States Patent
Chiu

(10) Patent No.: US 7,886,854 B2
(45) Date of Patent: Feb. 15, 2011

(54) WHEELCHAIR

(75) Inventor: Chien-Liang Chiu, Taipei (TW)

(73) Assignee: Wu's Tech Co., Ltd., Taipei (TW)

( * ) Notice: Subject to any disclaimer, the term of this patent is extended or adjusted under 35 U.S.C. 154(b) by 416 days.

(21) Appl. No.: 12/175,924

(22) Filed: Jul. 18, 2008

(65) Prior Publication Data

US 2010/0012404 A1 Jan. 21, 2010

(51) Int. Cl.
*B60K 1/00* (2006.01)

(52) U.S. Cl. ........................ 180/65.1; 180/907; 180/11; 280/250.1; 280/304.1

(58) Field of Classification Search ................. 180/907, 180/11, 15, 16, 65.1, 65.51, 23, 208, 209, 180/19.3; 280/250.1, 304.1; 403/108, 109.7
See application file for complete search history.

(56) References Cited

U.S. PATENT DOCUMENTS 2,448,992 A * 9/1948 Love et al. .................... 180/23
2,495,573 A * 1/1950 Duke ........................... 180/11
4,643,446 A * 2/1987 Murphy et al. .............. 280/648
5,036,938 A * 8/1991 Blount et al. ............... 180/208
5,150,762 A * 9/1992 Stegeman et al. ........... 180/208
5,195,803 A * 3/1993 Quintile ...................... 403/108
5,291,959 A * 3/1994 Malblanc ..................... 180/11
5,351,774 A * 10/1994 Okamoto ................... 180/65.1
5,762,154 A * 6/1998 Hsu ............................ 180/15
6,135,222 A * 10/2000 Furukawa ................ 180/65.51
6,224,156 B1 * 5/2001 Fleigle .................... 280/304.1
6,481,514 B2 * 11/2002 Takada ........................ 180/11
6,840,340 B2 * 1/2005 Inoue et al. ................ 180/65.1
6,860,347 B2 * 3/2005 Sinclair et al. ................ 180/11
7,028,799 B2 * 4/2006 Lin ............................ 180/208
7,144,026 B2 * 12/2006 Kao ........................ 280/250.1
7,275,608 B2 * 10/2007 Lo .............................. 180/11

* cited by examiner

*Primary Examiner*—Hau V Phan
(74) *Attorney, Agent, or Firm*—Egbert Law Offices PLLC

(57) ABSTRACT

The present invention provides a wheelchair structure, which is available with a handle, seat and wheel body. The handle is provided with an integrated control seat, and the wheel body is provided with auxiliary drive unit and combined positioning member. The integrated control seat can be assembled securely onto the wheelchair handles of different diameters and curvatures, and the swinging angle can be adjusted flexibly. Thus, it is possible to guarantee outstanding adaptability of assembly, efficient and convenient operation with improved applicability.

5 Claims, 7 Drawing Sheets

WHEELCHAIR

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a wheelchair, and more particularly to an innovative wheelchair.

2. Description of Related Art Including Information Disclosed Under 37 CFR 1.97 and 37 CFR 1.98

An independent auxiliary drive unit is already developed in the industry. The auxiliary drive unit is composed of a wheel body, drive motor, fuel cell and an integrated control seat. The auxiliary drive unit is mounted on the rear side of the wheelchair for driving the wheelchair. The integrated control seat of the auxiliary drive unit is assembled onto the handle of the wheelchair, and also provided with a starting switch and acceleration lever for startup/closing and speed control of the drive unit.

As for the typical integrated control seat, the coupling portion is often designed according to the specification and shape of the wheelchair handle, so the integrated control seat could only be assembled onto the customized wheelchair handle. Yet, there are control seats currently available with various specifications and shapes of the wheelchair handles, along with different sizes of hands and operating habits of the users. When the user is intended to install an auxiliary drive unit on the wheelchair, the user may find it difficult for assembly and positioning since the integrated control seat cannot be mated with the wheelchair handle. To this end, this auxiliary drive unit cannot be widely applied.

Moreover, the shortcoming of the typical auxiliary drive unit lies in inconvenient assembly and disassembly of the drive unit and the wheelchair, making it necessary for further improvement to meet the customer demands.

Thus, to overcome the aforementioned problems of the prior art, it would be an advancement in the art to provide an improved structure that can significantly improve efficacy.

Therefore, the inventor has provided the present invention of practicability after deliberate design and evaluation based on years of experience in the production, development and design of related products.

BRIEF SUMMARY OF THE INVENTION

Based upon the innovative wheelchair of the present invention, the assembly end of integrated control seat is provided with adjustable clamp and swinging portion. The integrated control seat can be assembled securely onto the wheelchair handles of different diameters and curvatures. The swinging angle can be adjusted flexibly, such that it is possible to guarantee outstanding adaptability of assembly, convenient adjustment and ease-of-operation to meet the diversified customer demands.

Based upon the arrangement of the combined positioning member, the assembly frame and the wheel body of wheelchair body can be connected and fixed easily. When it is intended for disassembly, the rings of pulling portion at top of left and right pins are pulled upwards via the connector, so that the assembly frame can be released. This structure ensures simple assembly and disassembly of the auxiliary drive unit and wheelchair body for efficient and convenient operation with improved applicability.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
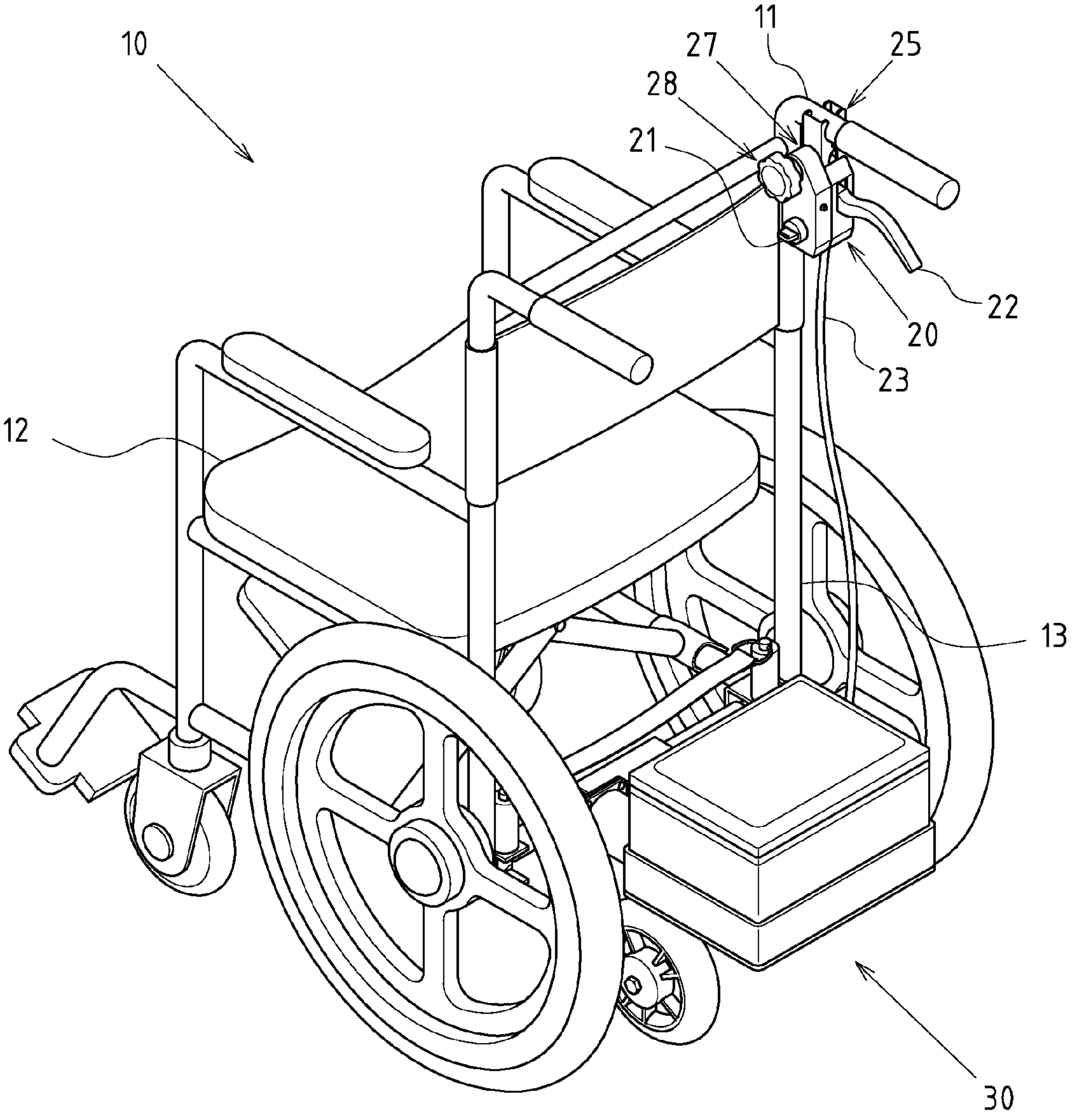
FIG. 1 depicts a perspective view of the present invention, showing the integrated control seat adapted onto the existing wheelchair handle.
Figure 2:
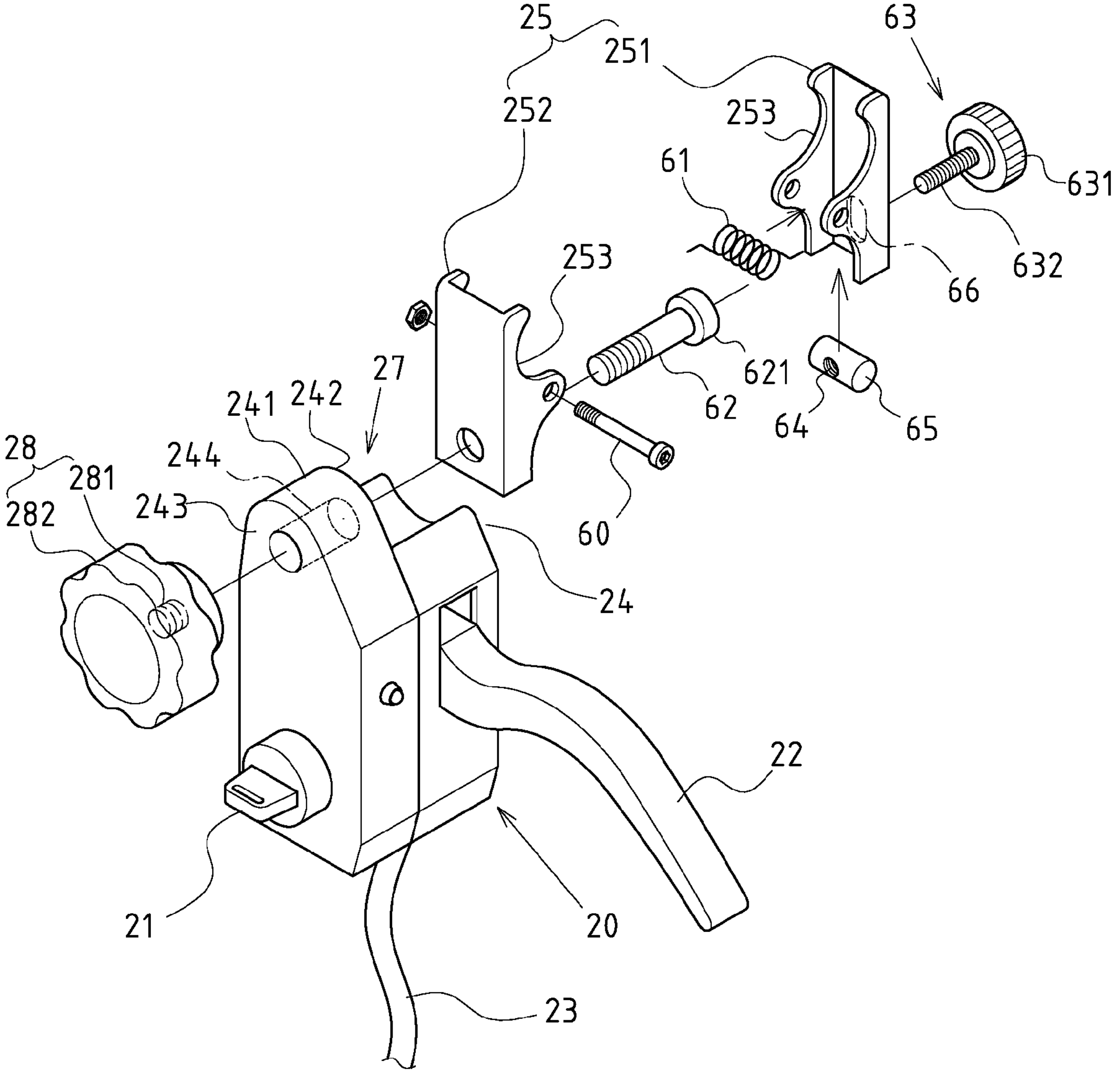
FIG. 2 depicts a partial exploded perspective view of the integrated control seat of the present invention.
Figure 3:
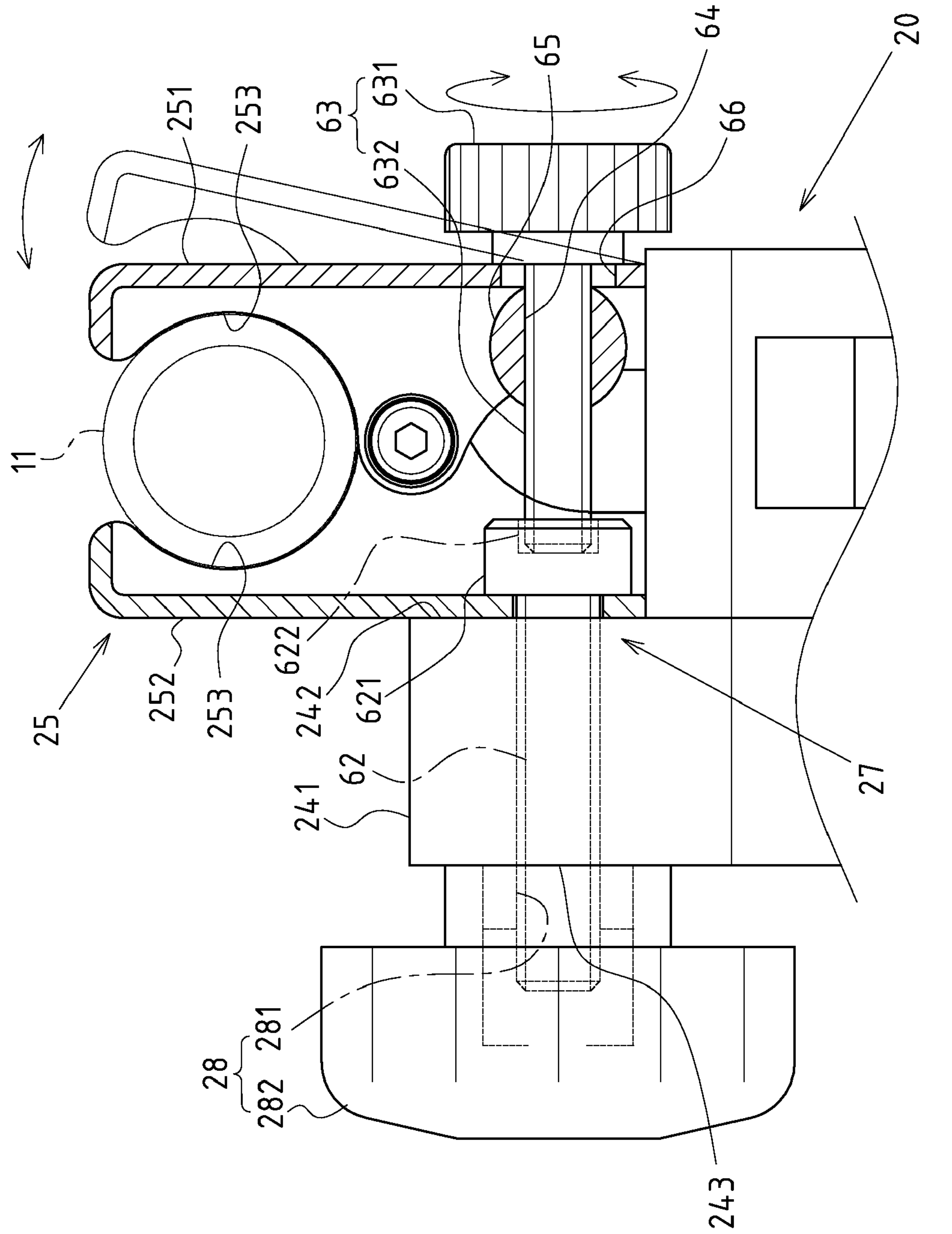
FIG. 3 depicts a partial assembled perspective view of the integrated control seat of the present invention.

The features and the advantages of the present invention will be more readily understood upon a thoughtful deliberation of the following detailed description of a preferred embodiment of the present invention with reference to the accompanying drawings.

FIGS. 1-8 depict preferred embodiments of wheelchair structure of the present invention. The embodiments are provided only for explanatory purposes with respect to the patent claims.

The wheelchair includes a wheelchair body 10 with a handle 11, a seat 12 and a wheel body 13.

The wheelchair also includes an integrated control seat 20, used to control the operating state of the auxiliary drive unit 30 installed on the wheelchair body 10. The integrated control seat 20 comprises a starting switch 21 and an acceleration lever 22. An electrical connecting wire 23 is fixed laterally on the integrated control seat 20. The integrated control seat 20 is provided with an assembly end 24 allowing for assembly onto the handle 11 of the wheelchair body 10. The assembly end 24 of the integrated control seat 20 is provided with an adjustable clamp 25, which contains clamping port 26 allowing to change the clamping amplitude. The assembly end 24 of the integrated control seat 20 comprises a swinging portion 27, which enables the integrated control seat 20 to change dynamically the swinging angle, and a control member 28 is assembled to adjust the adjustable positioning or release state of the swinging portion 27. The auxiliary drive unit 30 comprises a wheel body 31, a drive member 32 and a power supply assembly 33.

The wheelchair further includes an assembly frame 40, transversely assembled onto the auxiliary drive unit 30. The assembly frame 40 is defined into two assembly ends 41, and also is provided with adjustment member 42 that determines the extension length of two assembly ends 41.

The wheelchair includes a combined positioning member 50, assembled at left and right sides of the wheel body 13 of wheelchair body 10. The combined positioning member 50 contains a connecting slot 51, which is provided with a lateral guide inlet 52 and an internal retaining wall 53. At a top of the connecting slot 51, there is an accommodating seat 54, wherein a groove 55 is used for inserting a pin 56 and elastic member 57. A retaining portion 58 with a single-sided oblique guide surface 581 is arranged at bottom of the pin 56. The elastic member 57 is used for supporting downwards the pin 56 normally, enabling the retaining portion 58 to be protruded into the connecting slot 51 for positioning purpose, or enabling the single-sided oblique guide surface 581 to align with the lateral guide inlet 52 of the connecting slot 51. At a top of the pin 56, a pulling portion 59 is protruded from the accommodating seat 54 to pull upwards the pin 56 into a release state.

Based on internal and external plywood 251, 252 arranged symmetrically, the adjustable clamp 25 is screwed at the middle section via a pivot bolt 60. A torsion spring 61 is assembled at the pivot bolt 60, and, at inner side of the exterior of internal and external plywood 251, 252, a corresponding arched flange 253 is arranged to form the clamping port 26. The interior of the internal plywood 251 is fastened onto the integrated control seat 20 via a bolt 62. The adjustable clamp 25 also comprises a packing locator 63. The packing locator 63 has a screw bolt 632 with rotary knob 631 so that a rotating cylinder 65 with tapped hole 64 is screwed onto the interior of the external plywood 252, and a long through-hole 66 is opened on the inner wall of the internal plywood 251. Then, the screw bolt 632 is allowed to penetrate the long through-hole 66, and the tapped hole 64 of the rotating cylinder 65 is abutted into the trough 622 of the bolt head 621 at inner end of the internal plywood 251.

As for the preferred embodiment of the swinging portion 27 at the assembly end 24 of integrated control seat 20, a protruding seat 241 is formed on the assembly end 24 of the integrated control seat 20. The protruding seat 241 is defined to form an internal wall 242 and external wall 243. The protruding seat 241 is transversely provided with a through-hole 244, so that the inner wall of the internal plywood 251 of aforementioned adjustable clamp 25 is abutted onto the internal wall 242 of the protruding seat 241. The control member 28 is comprised of a rotary knob 282 with a threaded hole 281, and then the bolt 62 is used to penetrate the internal plywood 251 of the adjustable clamp 25, through-hole 244 of the protruding seat 241 and the threaded hole 281 of rotary knob 282, enabling the bolt head 621 of the bolt 62 to be abutted onto the internal plywood 251 of the adjustable clamp 25. The stud of the bolt 62 is screwed onto the threaded hole 281 of the rotary knob 282.

The assembly end 41 of the assembly frame 40 could be embedded into the lateral guide inlet 52 of the connecting slot 51, and then forcibly pushed forwards the single-sided oblique guide surface 581 to cross the retaining portion 58 of the pin 56. Next, the assembly end 41 of the assembly frame 40 is limited securely between the internal retaining wall 53 of the connecting slot 51 and the retaining portion 58 of the pin 56. Conversely, when the pin 56 is pulled upwards by the pulling portion 59, the retaining portion 58 is disengaged from the connecting slot 51, so the assembly end 41 of the assembly frame 40 could be released from the connecting slot 51.

A reducing through-hole 551 is arranged at top of the groove 55 of the accommodating seat 54, so that the top of the pin 56 penetrates the reducing through-hole 551 to form the pulling portion 59. Rings 70 are arranged on the pulling portion 59. Then, the rings 70 at the left and right sides of the pin 56 of the wheel body 13 of wheelchair body 10 are linked by a connector 71 (strip, rope, chain, rod) for simultaneous motion.

Figure 4:
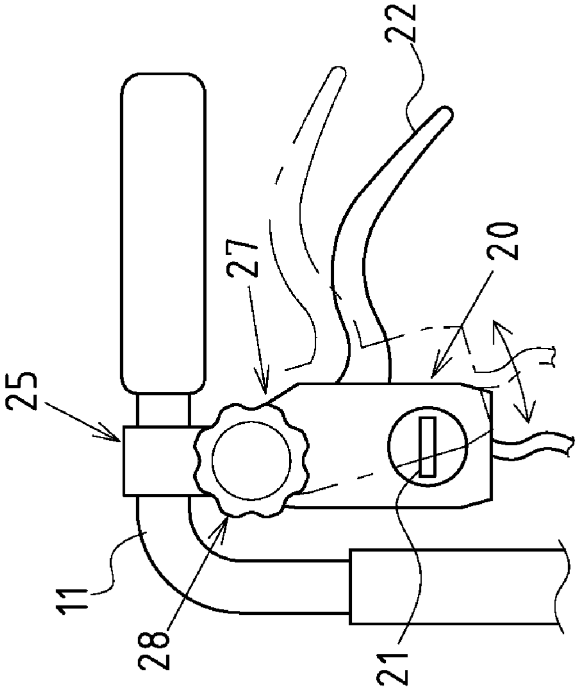
FIG. 4 depicts a schematic view of the integrated control seat of the present invention with adjustable swinging angle.

Based upon above-specified structures, the present invention is operated as follows:

One function of the integrated control seat 20 is that can be assembled onto wheelchairs of different diameters via the adjustable clamp 25. Referring to FIG. 4, the rotary knob 631 of the packing locator 63 could be rotated clockwise or counterclockwise to drive the screw bolt 632 and tapped hole 64 of the rotating cylinder 65 for relative screwing motion. The rotating cylinder 65 will shift forwards and backwards on the screw bolt 632, thus driving the external plywood 252 to generate swinging behavior, leading to varied clearance of the clamping port 26 formed between internal and external plywood 251, 252 of the adjustable clamp 25. Based on the adjustable structure of the clamping port 26 of the adjustable clamp 25, the integrated control seat 20 could be assembled onto the handle 11 of different diameters; meanwhile, the adjustable clamp 25 could be fastened securely with the use of packing locator 63.

The second function of the integrated control seat 20 is to change the swinging angle of the integrated control seat 20 via the swinging portion 63, so as to adjust the spacing between the acceleration lever 22 and handle 11 for manual operation. Referring to FIG. 4, the rotary knob 282 of the control member 28 could be rotated clockwise or counterclockwise to control the positioning or adjustment state of the integrated control seat 20. When the rotary knob 282 is loosened, the internal wall 242 of the protruding seat 241 and the internal plywood 251 of the adjustable clamp 25 will become loosened, so the swinging angle of the integrated control seat 20 can be adjusted. Conversely, when the rotary knob 282 is tightened, the internal wall 242 of the protruding seat 241 and the internal plywood 251 of the adjustable clamp 25 will become tightened for positioning the integrated control seat 20.

Figure 5:
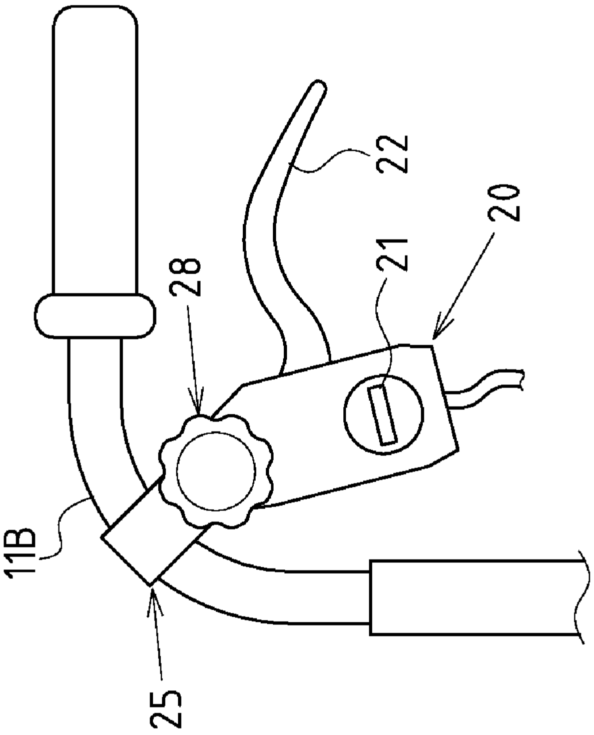
FIG. 5 depicts a schematic view of the application of the present invention, showing the integrated control seat adapted onto another wheelchair handle.

Additionally, based on the adjustable swinging characteristics, the integrated control seat 20 can be applied to wheelchair handles of different shapes. Referring to FIG. 4, the adjustable clamp 25 of the integrated control seat 20 is adapted onto the cross-bar section of the handle 11. Referring also to FIG. 5, the adjustable clamp 25 of the integrated control seat 20 is adapted onto the curved section of the handle 11B.

Figure 6:
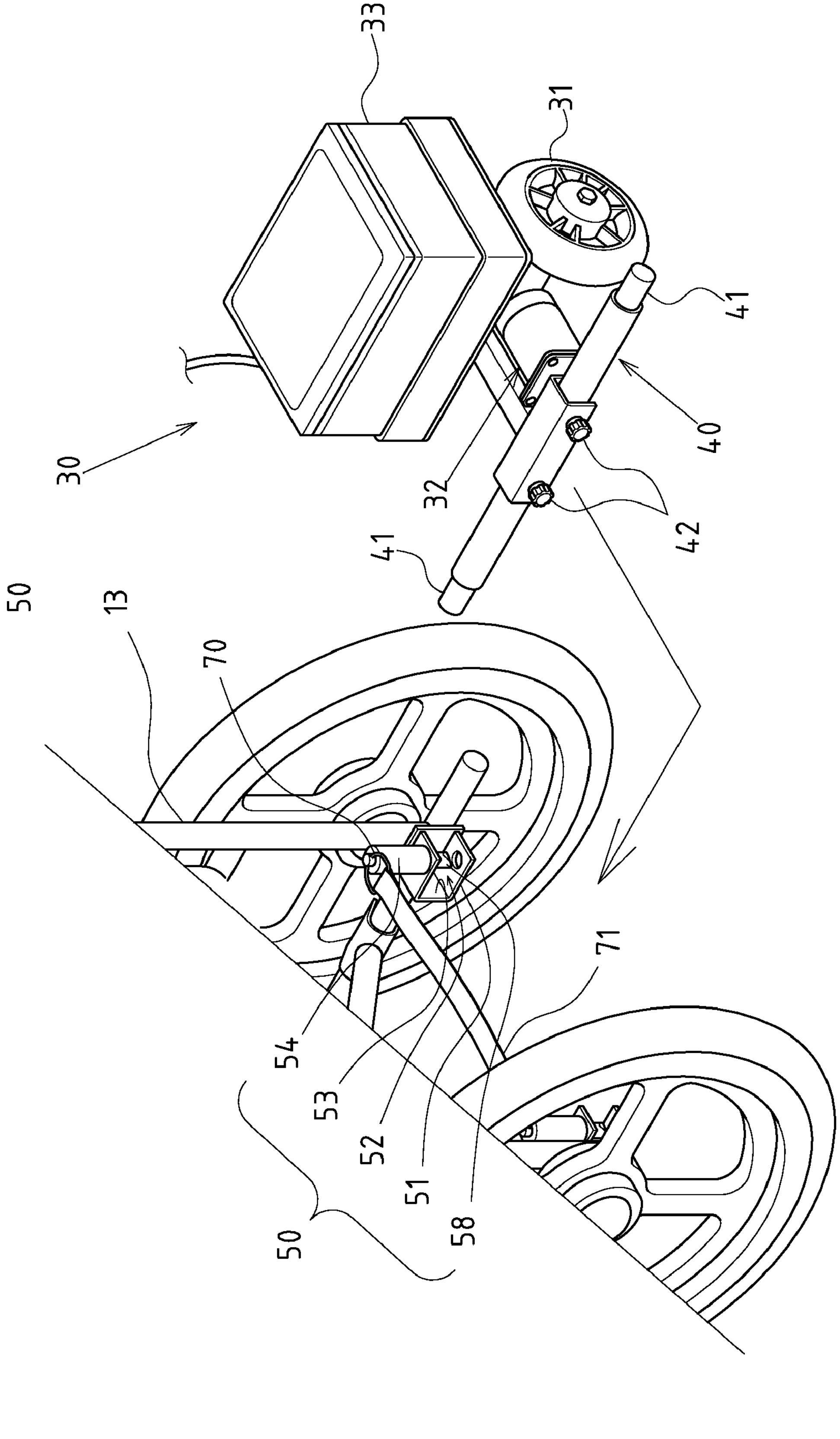
FIG. 6 depicts an exploded perspective view of the wheel body and auxiliary drive unit of the present invention.

Referring to FIG. 6, the assembly frame 40 is provided with adjustment member 42 that can define the protruding length of two assembly ends 41 in line with the extended width of the wheelchair body 10.

Figure 7:
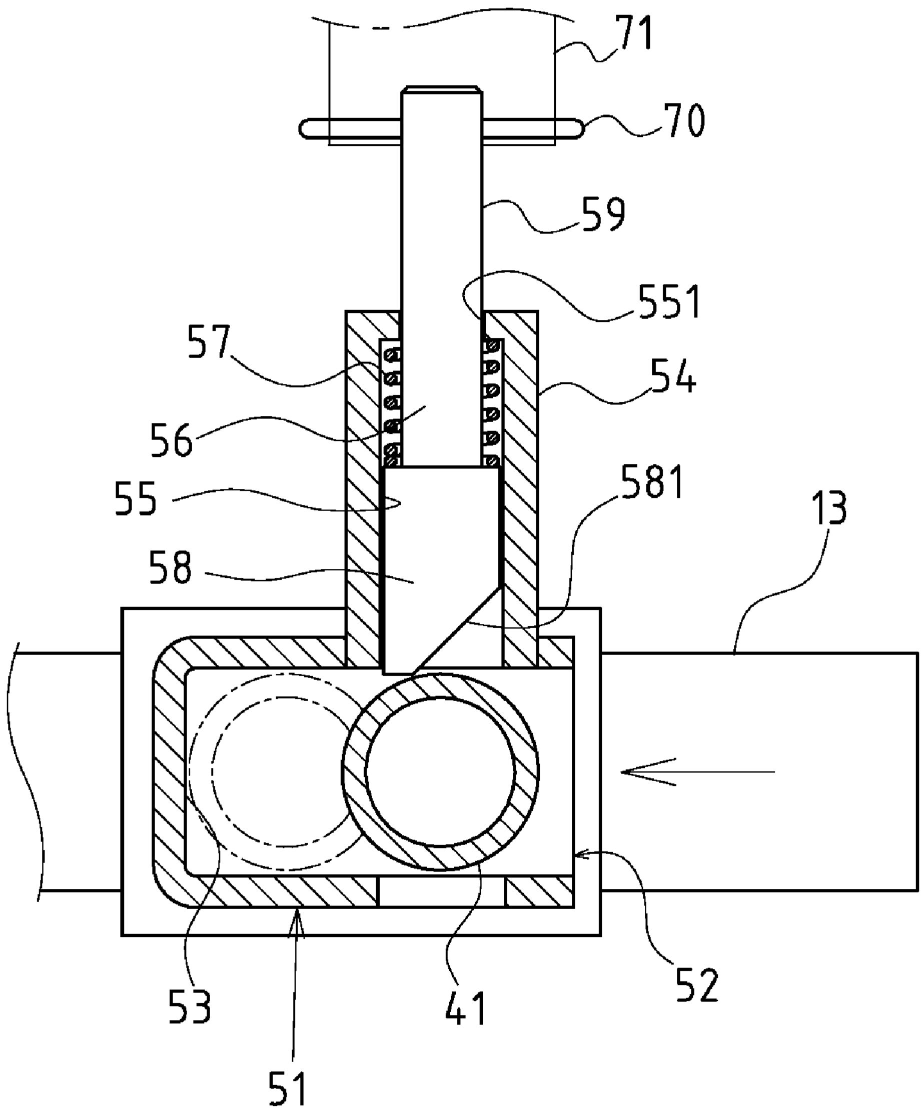
FIG. 7 depicts an assembled schematic view of the assembly end of the assembly frame and the connecting slot of the wheelchair frame.

Referring to FIG. 7, when the assembly end 41 of the assembly frame 40 enters transversely into the lateral guide inlet 52 of the connecting slot 51, the assembly end 41 will slide along the single-sided oblique guide surface 581, so that the retaining portion 58 will push upwards the elastic member 57 and make it accumulate elastic force under the transverse force applied by the assembly end 41. As such, the assembly end 41 can smoothly slide into the connecting slot 51. When the assembly end 41 passes through the retaining portion 58, the elastic member 57 will release the elastic force, and then the retaining portion 58 will slide down and protrude from the groove 55. The assembly end 41 is just positioned between the internal retaining wall 53 and retaining portion 58.

Figure 8:
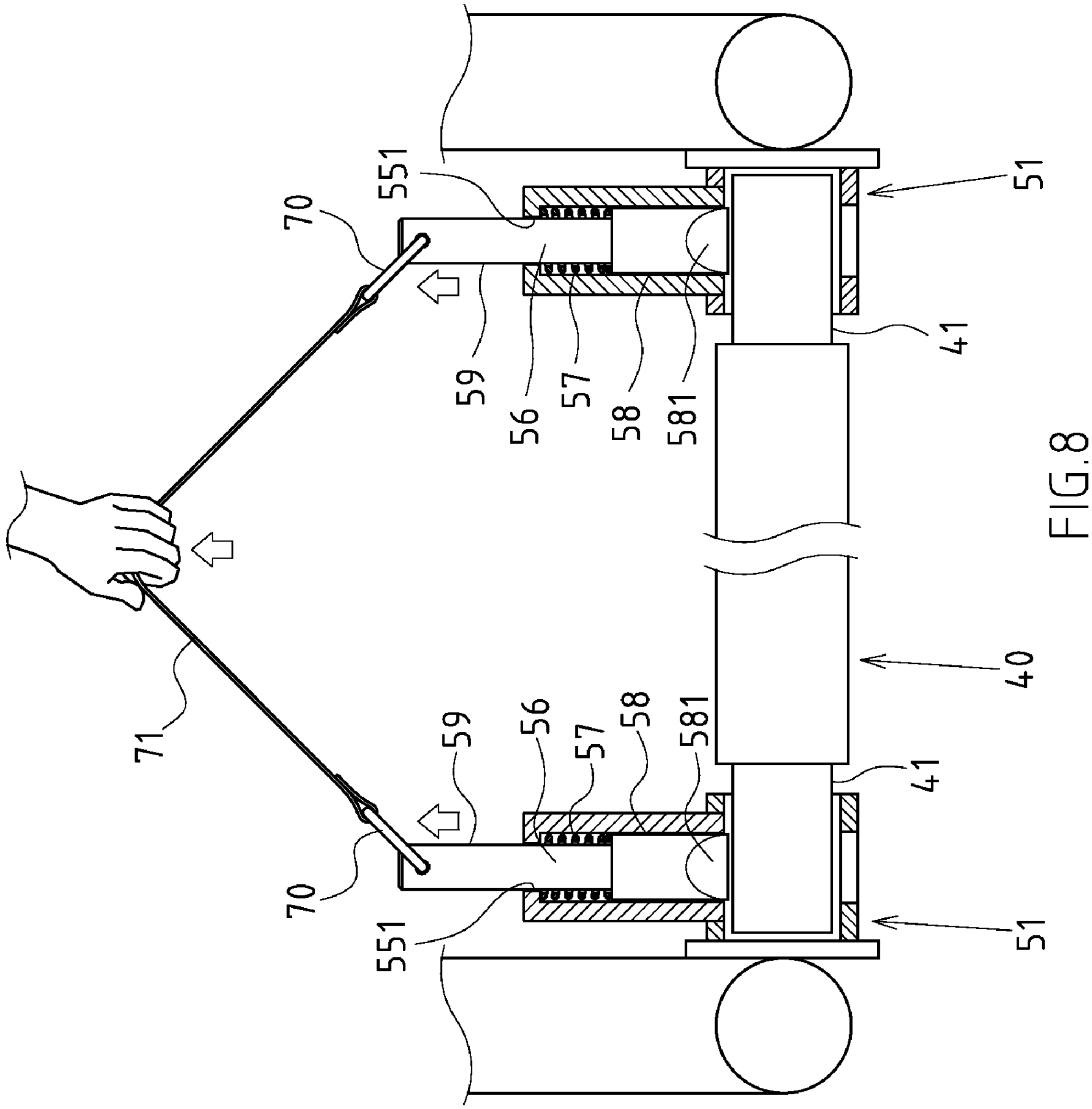
FIG. 8 depicts a schematic view of the operation of the present invention, showing the pins at both sides of the wheelchair frame being driven by the connector.

Referring to FIG. 8, the pulling portion 59 is fitted with a ring 70. The rings 70, at left and right sides of the pin 56 of the wheel body 13, are linked by a connector 71 (strip, rope, chain, rod) for simultaneous motion. When it is intended to be disengaged from the assembly end 41 at both ends of the assembly frame 40, the connector 71 could be pulled so that the pulling portion 59 at top of the pin 56 can protrude simultaneously from the reducing through-hole 551, allowing the retaining portion 58 to recess into the groove 55 and then disengage the assembly end 41 of the assembly frame 40.

I claim:

1. A wheelchair structure, comprising:

a wheelchair body, having a handle, a seat and a wheel body;

an integrated control seat, comprising a starting switch, an acceleration lever and an electrical connecting wire fixed laterally on the integrated control seat, said integrated control seat being provided with an assembly end engaging said handle of said wheelchair body having an adjustable clamp, said adjustable clamp having a clamping port with a variable clamping amplitude, said assembly end having a swinging portion and a control member, said integrated control seat having swinging angle set by said swinging portion, said control member engaging said swinging portion into an adjustable positioning or release state;

an auxiliary drive unit, comprising a wheel body, a drive member and a power supply assembly;

an assembly frame, being transversely assembled onto said auxiliary drive unit, having two assembly ends;

a combined positioning member, being assembled at left and right sides of said wheel body and having a connecting slot with a lateral guide inlet and an internal retaining wall, said connecting slot having an accommodating seat at a top thereof;

a groove with a pin and elastic member inserted therein; and a retaining portion with a single-sided oblique guide surface arranged at a bottom of said pin said elastic member supporting said pin downward, said retaining portion being protruded into said connecting slot, said single-sided oblique guide surface being aligned with a lateral guide inlet of said connecting slot, said pin having a pulling portion as a top thereof, said pulling portion being protruded from said accommodating seat, said pin being pulled upward into a release state.

2. The wheelchair structure defined in claim 1, wherein the adjustable clamp is screwed via a pivot bolt at the middle section through symmetrical internal and external plywood via a pivot bolt, and wherein a torsion spring is assembled at the pivot bolt, said clamping port being formed at an inner side of the exterior of internal and external plywood by a corresponding arched flange, an interior of the internal plywood being fastened onto the integrated control seat via a bolt, the adjustable clamp further comprising a packing locator having a screw bolt with rotary knob, a rotating cylinder with tapped hole being screwed onto the interior of the external plywood, a through-hole being opened on the inner wall of the internal plywood, a screw bolt penetrating said through-hole, the tapped hole of the rotating cylinder being abutted into a trough of a bolt head at an inner end of the internal plywood.

3. The wheelchair structure defined in claim 1, wherein a protruding seat is formed on the assembly end of the integrated control seat, said protruding seat being defined to form internal and external walls, said protruding seat being transversely provided with a through-hole, one side of said adjustable clamp being abutted onto the internal wall of the protruding seat, said control member being comprised of a rotary knob with a threaded hole, bolt penetrating the adjustable clamp, through-hole of the protruding seat and the threaded hole of rotary knob, said bolt head of the bolt being abutted onto one end of the adjustable clamp, a stud of the bolt being screwed onto the threaded hole of the rotary knob.

4. The wheelchair structure defined in claim 1, wherein the assembly end of the assembly frame is embedded into the lateral guide inlet of the connecting slot and forcibly pushed forwards the single-sided oblique guide surface, the assembly end entering into the connecting slot for a positioning state, the pulling portion being provided with a ring, the rings at left and right sides of the pin of the wheel body of wheelchair body being linked by a connector for simultaneous motion.

5. The wheelchair structure defined in claim 4, wherein said connector is selected from a group consisting of a strip, rope, chain or rod.

* * * * *